(12) United States Patent
Brahmer

(10) Patent No.: US 9,050,644 B2
(45) Date of Patent: Jun. 9, 2015

(54) DEVICE AND METHOD FOR THE CUTTING SHOCK DAMPING OF WORK MACHINES

(75) Inventor: Bert Brahmer, Bruchsal (DE)

(73) Assignee: VOITH PATENT GMBH, Heidenheim (DE)

( * ) Notice: Subject to any disclaimer, the term of this patent is extended or adjusted under 35 U.S.C. 154(b) by 626 days.

(21) Appl. No.: 13/390,763

(22) PCT Filed: Jul. 6, 2010

(86) PCT No.: PCT/EP2010/059617
§ 371 (c)(1),
(2), (4) Date: Feb. 16, 2012

(87) PCT Pub. No.: WO2011/038947
PCT Pub. Date: Apr. 7, 2011

(65) Prior Publication Data
US 2012/0175141 A1    Jul. 12, 2012

(30) Foreign Application Priority Data
Sep. 29, 2009    (DE) .......................... 10 2009 048 483

(51) Int. Cl.
*B21D 24/14*    (2006.01)
*B30B 15/16*    (2006.01)
(Continued)

(52) U.S. Cl.
CPC . *B21D 28/20* (2013.01); *F16F 9/26* (2013.01); *B30B 15/16* (2013.01); *B21D 24/14* (2013.01)

(58) Field of Classification Search
CPC ........ B21D 24/14; B21D 28/20; B21D 24/02; B21D 24/2414; B26D 5/20; B26D 7/06; B30B 15/16; F15B 11/044; F16F 9/26

USPC ......... 173/162.1, 210, 211, 212, 162.2, 1, 31, 173/37, 169, 170; 72/351, 453.13; 91/420, 91/443, 447, 461; 83/13, 76.1, 137, 684, 83/697; 227/151, 152, 154
See application file for complete search history.

(56) References Cited

U.S. PATENT DOCUMENTS 4,531,449 A * 7/1985 Reith .............................. 91/420
5,100,113 A * 3/1992 Imanishi ....................... 267/119
(Continued)

FOREIGN PATENT DOCUMENTS

| DE | 1427403 | 11/1968 |
| DE | 2824176 | 12/1979 |

(Continued)

OTHER PUBLICATIONS

First Office Action issued by the State Intellectual Property Office of People's Republic of China for Application No. 2010800438561, dated Dec. 2, 2013 (8 pages).
(Continued)

*Primary Examiner* — Scott A. Smith
(74) *Attorney, Agent, or Firm* — Michael Best & Friedrich LLP

(57) ABSTRACT

A device for cutting shock damping of work machines, for example, for presses and stamping or nibbling machines, and a method for cutting shock damping. Embodiments of the invention are employed in work machines that have a machine frame and a working drive for moving a working tool along a working direction, and in which the machine frame is deformed elastically by a working force exerted by the working drive for machining a workpiece. The working drive provides a control variable for determining the working force of the work machine.

16 Claims, 1 Drawing Sheet

(51) Int. Cl.
*B21D 28/20* (2006.01)
*F16F 9/26* (2006.01)

(56) References Cited

U.S. PATENT DOCUMENTS

| | | | |
|---|---|---|---|
| 5,295,383 A | 3/1994 | Kirii et al. | |
| 7,194,947 B2 * | 3/2007 | Mentink | 91/420 |
| 8,302,517 B2 * | 11/2012 | Fahrenbach | 83/137 |
| 8,549,983 B2 * | 10/2013 | Brahmer | 91/420 |
| 2007/0101841 A1 * | 5/2007 | Fahrenbach | 83/13 |

FOREIGN PATENT DOCUMENTS

| | | |
|---|---|---|
| DE | 2911820 | 10/1980 |
| DE | 10252350 | 5/2004 |
| DE | 102005053350 | 5/2007 |
| DE | 102007027603 | 12/2008 |
| EP | 0365317 | 4/1990 |
| EP | 0531141 | 3/1992 |
| EP | 1602419 | 12/2005 |
| JP | 4187399 | 7/1992 |

OTHER PUBLICATIONS

German Application No. 102009048483.3 Examiner's Report dated May 18, 2010 (5 pages).

PCT/EP2010/059617 International Search Report dated Dec. 28, 2010 (9 pages).

PCT/EP2010/059617 International Written Opinion dated Nov. 4, 2011 (20 pages).

* cited by examiner

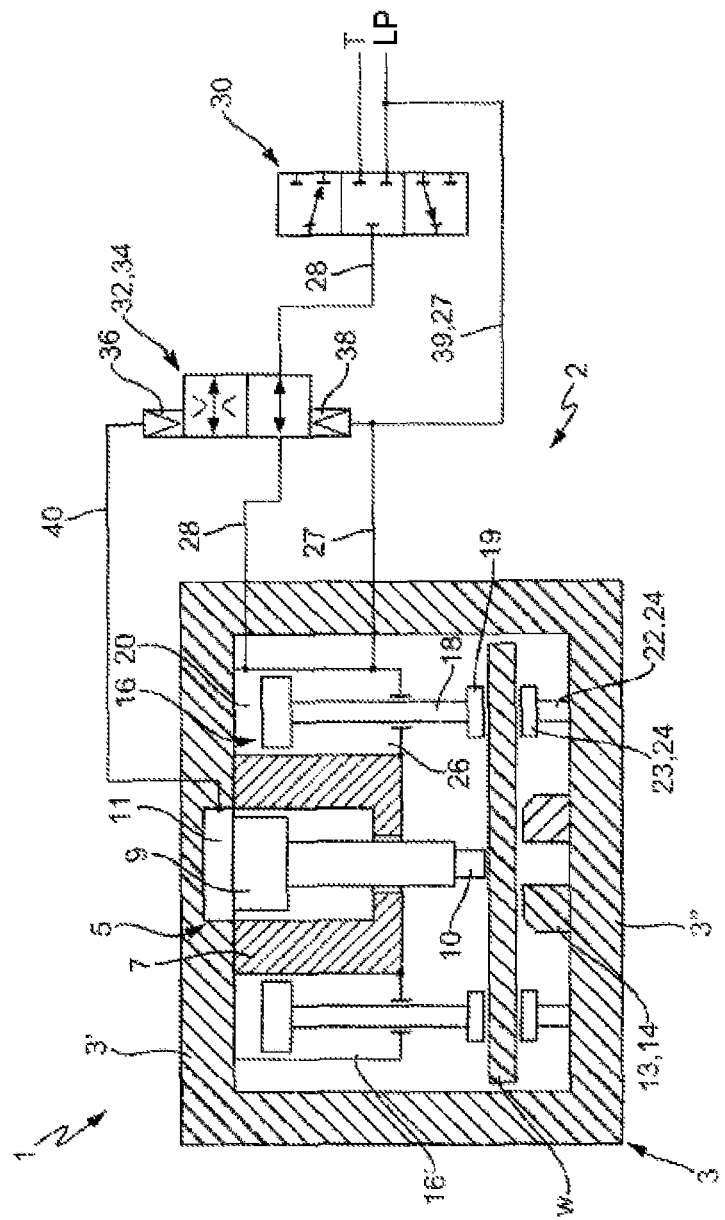

DEVICE AND METHOD FOR THE CUTTING SHOCK DAMPING OF WORK MACHINES

BACKGROUND OF THE INVENTION

The invention relates to a device for cutting shock damping of work machines, in particular for presses and stamping or nibbling machines, and to a method for cutting shock damping. The invention is employed in work machines which have a machine frame and a working drive for moving a working tool along a working direction, and in which the machine frame is deformed elastically by a working force exerted by the working drive for machining a workpiece, the working drive providing a control variable for determining the working force.

In machining, for example stamping, of a fixed workpiece, forces varying sharply in time occur between the working tool and machine frame and, in particular, may also change abruptly. In this case, a distinction can be made in a simplified way between a pressure build-up phase and a cutting breakthrough phase. During the pressure build-up phase, the working tool lies on the workpiece and an increased working force is built up by means of the working drive. The machine frame absorbs the working force exerted by the working drive upon the workpiece, since the workpiece provides a counterforce corresponding to the working force. In this case, the machine frame is deformed elastically to a certain extent. In particular, expansion of the machine frame along the direction of the working force of the working drive takes place. During the pressure build-up phase, comparatively high energy may therefore be stored in the elastic deformation of the machine frame.

At the moment of the cutting breakthrough, the workpiece yields abruptly to the working tool. The counterforce provided by the workpiece consequently ceases suddenly, thus leading to a correspondingly abrupt detensioning of the elastically deformed machine frame. Elastic reforming therefore occurs during detensioning, typically within fractions of a millisecond. The stored energy is released partially in the form of sound waves, thus leading to noise generation designated as "cutting shock".

Due to the sudden reforming, the work machines, in particular the machine frame and mounted functional elements, are subjected to a particularly increased load. This, on the one hand, may shorten the useful life of the work machine and, on the other hand, have an adverse effect upon the machining quality of the workpiece.

For damping the undesirable cutting shock, in particular, devices with hydraulic damping cylinders have become known. Thus, for example, DE 10 2005 053350 A1 shows a controllable supporting arrangement for generating a variable force between a ram and a press platen of a press. The supporting arrangement is in this case controlled as a function of the position of the ram. The device is then set to the workpiece to be machined so that, at the moment of the cutting breakthrough, the supporting arrangement absorbs the working force of the ram. This solution requires a technically complicated sensor arrangement for detecting the ram position and makes it necessary to calibrate the supporting arrangement for different materials and different geometric dimensions of the workpiece to be machined.

SUMMARY OF THE INVENTION

The device provides a supporting cylinder with a supporting piston which is moveable along the working direction and which delimits a supporting pressure space which can be acted upon with pressure fluid for moving the supporting piston. In conjunction with the features of the preamble, there is in this case provision for the supporting cylinder to be disposed on the machine frame in such a way that elastic reforming of the machine frame can be damped via a movement of the supporting piston in the supporting cylinder, and for the device to have an actuating unit which is controllable by the control variable of the working drive and which can be switched between a throttle position and a passage position for the selective throttling or essentially throttle-free release of the outflow of pressure fluid from the supporting pressure space. The actuating unit is in this case designed in such a way that a switching threshold value can be stipulated, and in such a way that the actuating unit assumes the passage position when the control variable lies below the switching threshold value, and whereat the actuating unit switches into the throttle position for damping the elastic reforming when the control variable overshoots the switching threshold value.

In the device according to the invention, the supporting cylinder acts, in particular, upon those portions of the machine frame which are deformed elastically by the working force and which are correspondingly reformed elastically during the cutting breakthrough of the workpiece. At the moment of the cutting breakthrough, the supporting cylinder at least briefly provides a supporting force which counteracts the abrupt reforming of the machine frame. This supporting force thus acts at least briefly upon the machine frame in a way which is similar to the action of the working force shortly before or at the moment of the cutting breakthrough. The elastic reforming is then damped as a result of a movement of the supporting piston in the supporting cylinder, for example in that the supporting piston is pressed in during elastic reforming. Elastic reforming is thus associated with a movement of the supporting piston in the supporting cylinder. For this purpose, in particular, the supporting piston may be supported directly or indirectly on the machine frame.

Cutting shock damping is not in this case passive damping, but is controlled actively as a function of the working drive. The control variable, related to the working force, of the working drive serves as a control criterion. Thus, direct control of damping, for example via the position of the working tool or the time point during a work operation, as is known from the prior art, precisely does not take place in the cutting shock damping according to the invention.

A threshold for the working force is fixed via the switching threshold value for the control variable. If the working force overshoots this threshold while the working tool is building up pressure upon the workpiece (pressure build-up phase), the actuating unit switches from the passage position into the throttle position. In the throttle position, an outflow of pressure fluid from the supporting pressure space is possible only slowly, that is to say in a throttled way.

During the cutting breakthrough of the workpiece, elastic reforming leads to a movement of the supporting piston in the supporting cylinder. Since this movement is associated with a change in volume of the supporting pressure space, in the throttle position the supporting cylinder counteracts rapid reforming of the machine frame. The cutting shock initially outlined and the adverse effects associated with it are thus avoided or at least reduced.

Cutting shock damping for the reforming of the machine frame is to that extent activated only when the extended working force overshoots the threshold stipulated by the switching threshold value for the control variable. In practice, a harmful cutting shock arises only in the case of forces which overshoot a certain minimum force and lead to a certain extent of elastic deformation. Only in these cases is cutting shock damping necessary. In cutting shock damping according to the invention, the switching threshold value may be selected in such a way that damping takes place only in the required cases. If, for example, the workpiece to be stamped is very thin or can be stamped easily, the switching threshold is not overshot and cutting shock damping is not activated, as outlined above. This is therefore advantageous particularly because the damping of abrupt elastic reforming entails a time delay. Consequently, the cutting shock damping according to the invention also improves the efficiency of a work machine in that a slowing of the process is avoided if cutting shock damping is not required.

Moreover, the described activation of cutting shock damping via the switching threshold value has the advantage that the presetting of cutting shock damping can take place independently of the workpiece actually to be machined or of the actual time profile or force profile of the work process. When cutting shock damping is activated as a function of the position of the working tool, as is known from the prior art, by contrast new calibration may become necessary when the nature of the workpiece (for example, thickness or strength) is changed. Also when cutting shock damping is activated as a function of the time profile of the machining operation, recalibration is necessary when the work process is changed. By contrast, the cutting shock damping according to the invention can be preset independently of the workpiece or of the work process.

In practice, the switching threshold is preferably selected in such a way that cutting shock damping in the course of the work process for machining the workpiece is activated before the cutting breakthrough, and not only when a cutting breakthrough is detected, as is known from the prior art. What can be achieved thereby is that even those elastic reforming processes which occur within a very short time (within fractions of milliseconds) are covered completely by cutting shock damping.

The invention is developed in that the machine frame has a first frame portion, on which the working drive is disposed, and the machine frame has a second frame portion, against which the workpiece can be brought to bear for its machining, the supporting cylinder being disposed so as to act between the first frame portion and the second frame portion in such a way that elastic reforming of the machine frame can be damped. In this case, the supporting cylinder may be disposed on the first frame portion and the supporting piston may act indirectly or directly against the second frame portion. Of course, conversely, the supporting cylinder may also be disposed on the second frame portion and the supporting piston may act indirectly or directly against the first frame portion. It does not matter in this case whether the machine frame is designed in the form of a continuous frame ("O-stand") or in the form of a frame open on one side ("C-stand"). In either event, the machine frame provides a force connection between the working drive and the workpiece, via which force connection the counterforce to the working force acting upon the workpiece can be transmitted.

Preferably, the actuating unit is disposed in a pressure line, via which the supporting pressure space can be connected to a reservoir for pressure fluid. Throttling then takes place within the pressure line. It is conceivable that a connection of the supporting pressure space to a pressure fluid supply (LP) also takes place via the pressure line.

The actuating unit is advantageously designed as a throttle valve which, in the throttle position, has a flow cross section for pressure fluid which is reduced, as compared with the passage position. Both in the throttle position and in the passage position, the pressure fluid therefore flows solely through the throttle valve.

On the other hand, it is conceivable that the actuating unit has a flow diaphragm for throttling the outflow and a bypass line which is parallel to the flow diaphragm and in which is disposed an actuating valve which is closed in the throttle position and open in the passage position. In this embodiment, therefore, in the passage position, in additional flow path parallel to the throttle is provided.

A possible development of the invention arises in that the working drive is designed as a hydraulic cylinder with a working pressure space which can be acted upon with pressure for moving the working tool in the working direction. The pressure in the working pressure space thus constitutes the control variable for determining the working force of the working drive. Hydraulic drives are mostly advantageously used when high working forces are to be provided.

To change over from the passage position to the throttle position, the actuating unit advantageously provides a hydraulic active surface, the active surface being prestressable in the passage position for stipulating the switching threshold value, and the active surface being capable of being acted upon with the pressure prevailing in the working pressure space. In this embodiment, both the working drive and the actuating unit are thus operated by the action of pressure, in particular hydraulically. The control of the actuating unit in this case takes place by means of the pressure prevailing in the working pressure space. The active surface is disposed, in particular, on an actuating member which can be moved for changeover from the passage position to the throttle position. For prestressing in the passage position, for example, a mechanical spring may be provided. On the other hand, it is conceivable that the actuating unit is designed as a hydraulic valve with a double piston delimiting a pressure space which can be acted upon hydraulically for prestressing the actuating unit in the passage position.

Instead of the hydraulic working drive, it is conceivable that the working drive is designed as an electric drive which can be supplied electrically with driving current for moving the working tool. The driving current thus constitutes the control variable for determining the working force of the working drive. For example, an electric motor may be provided, which via a gear drives a working piston on which the working tool is disposed. In this case, with regard to the electric motor, the driving current is related to the torque of the electrical motor and therefore to the working force.

In this case, the actuating unit advantageously has an electrically actuatable switching member for changing over from the passage position to the throttle position, the switching member being prestressable in the passage position for stipulating the switching threshold value and being switchable to the throttle position as a function of the driving current. For this purpose, for example, a solenoid valve may be used, which has a valve piston which is moveable between the passage position and the throttle position and which is prestressed in the passage position.

As compared with a hydraulic version, a device with an electric working drive, particularly in cooperation with the electrically actuatable switching member, has moveable components which have a usually lower mass. The advantage of this is that, on the one hand, rapid changes in movement and therefore rapid work processes of the working tool are possible and, on the other hand, cutting shock damping can be activated within a very short time via a comparatively quick-reaction, electrically actuatable switching member.

Instead of a hydraulic or electrical version of the working drive, the invention can also be applied to other drive concepts. If, for example, the working tool is driven by a flywheel via an eccentric, the control variable for determining the working force can be provided, for example, by correspondingly disposed force or torque sensors.

In a further refinement of the invention, a regulating valve is provided, via which the supporting pressure space can be connected to a pressure fluid supply. The supporting pressure space can thereby be filled with pressure fluid during a work operation in such a way that the supporting piston actively executes a movement which follows the elastic deformation of the machine frame.

In particular, it is conceivable that the supporting pressure space is acted upon with pressure fluid during the work process and the supporting piston thereby exerts a force upon the machine frame in such a way that the machine frame is prestressed in the direction of elastic deformation. It became apparent, in this context, that the cutting shock damping described operates more effectively when the machine frame is prestressed via the supporting cylinder during elastic deformation.

A preferred refinement arises in that the regulating valve is disposed in the pressure line between the actuating member and the reservoir, the regulating valve being designed in such a way that the actuating member can be connected selectively to the pressure fluid supply or to the reservoir. Consequently, only a single pressure line is provided for supplying the supporting pressure space, thus making an easily comprehensible and compact set-up possible. The regulating valve used may be, for example, a 3/2-way valve that has a control drive which is connected to the pressure line and which is connectable selectively to an access connected to the pressure fluid supply or an access connected to the reservoir.

In an especially preferred refinement, the machine frame has a bearing portion, onto which the workpiece can be laid for machining, the supporting piston acting on the workpiece when the supporting pressure space is acted upon with pressure. In particular, the supporting piston acts upon the workpiece in the region in which the workpiece lies on the bearing portion.

In particular, at least one supporting bolt with a bearing plate may be arranged on the machine frame in such a way that the supporting piston acts upon a supporting bolt via the workpiece. The indirect action of the supporting piston upon the machine frame via the workpiece has the advantage that the supporting piston can be disposed in the immediate vicinity of the working drive. This may be advantageous for the quality of damping of elastic reforming, since elastic deformation occurs mainly in the region of the working drive. Since the supporting piston is supported on the workpiece, the space available to the workpiece during machining is not restricted. This is advantageous particularly when very large, for example board-like workpieces are to be machined. This often necessitates machine frames with extensive carrier portions in order to provide sufficient space for receiving a large workpiece. However, machine frames of this kind are subject to comparatively high elastic deformation in the region of the extensive carrier portion. The above-described refinement makes it possible to dispose the supporting piston, without impeding the workpiece, precisely in the region in which high deformation or reforming of the machine frame occurs.

An advantageous refinement arises in that the supporting piston delimits a release pressure space which can be acted upon with pressure fluid for moving the supporting piston opposite to the working direction. This makes it possible to retract the supporting piston in the supporting cylinder, this being advantageous, for example, for changing or feeding the workpiece or for conversion work on the work machine and/or the device for cutting shock damping.

Preferably, at least two jointly acting supporting cylinders are provided, which, in particular, are disposed symmetrically with respect to the working drive. Asymmetric loads upon the machine frame can thereby be avoided, since the damping of elastic reforming takes place symmetrically with respect to the working drive causing the elastic deformation. On the other hand, it is conceivable that the supporting cylinders are disposed asymmetrically with respect to the working drive. This may be advantageous, for example, in the case of work machines with a machine frame designed asymmetrically, for example as a C-stand.

The set object is also achieved by means of a method for cutting shock damping which is used in work machines of the type initially described. For carrying out the method, it is necessary to have a machine frame-side supporting cylinder which comprises a supporting piston moveable as a result of the action of pressure fluid upon a supporting pressure space and which is disposed on the machine frame in such a way that elastic reforming of the machine frame can be damped via a movement of the supporting piston in the supporting cylinder. During the elastic deformation of the machine frame, in the method the supporting pressure space is filled with pressure fluid, with the result that the supporting piston is moved in the supporting cylinder. In the method, furthermore, a switching threshold value is stipulated for the control variable, the outflow of pressure fluid from the supporting pressure space being throttled for damping the elastic reforming of the machine frame when the control variable overshoots the switching threshold value. As already described further above with regard to the device according to the invention, the outflow of pressure fluid from the supporting pressure space is otherwise essentially released, in so far as the control variable lies below the switching threshold value.

The method is developed in that the outflow from the supporting pressure space is throttled before elastic reforming during the machining of the workpiece takes place. As already explained, reforming takes place precisely when the working force diminishes abruptly during the machining of the workpiece, in particular when the workpiece yields completely to the working tool (cutting breakthrough phase). The described cutting shock damping according to the invention is thus activated before the cutting breakthrough. As a result, even cutting shocks occurring for a very short period of time (a few fractions of a millisecond) are covered completely by the cutting shock damping according to the invention.

An especially preferred method for cutting shock damping provides for the supporting pressure space to be acted upon for exerting a supporting force during the elastic deformation of the machine frame. As a result, during the pressure build-up phase, the machine frame is not only prestressed with the supporting force by the working drive, but also by the supporting cylinder. This has proved to be advantageous for the effectiveness of cutting shock damping during elastic reforming after the cutting breakthrough of the workpiece. In particular, uniform prestressing of the machine frame can be achieved, with the result that increased load due to asymmetric deformation can be avoided.

BRIEF DESCRIPTION OF THE DRAWING

Further details and advantageous refinements of the invention may be gathered from the following description, by means of which the embodiment of the invention illustrated in the figure is described and explained in more detail.

FIG. 1 shows a diagrammatic illustration of a stamping machine 1 with a device 2 according to the invention for cutting shock damping.

DETAILED DESCRIPTION

The stamping machine 1 has a machine frame 3 which is designed in the form of a continuously closed O-stand. Alternatively, it is also conceivable that the machine frame 3 is open on one side ("C-stand"). The machine frame 3 has a first portion 3' and a second portion 3", in FIG. 1 the first portion 3' being formed by the upper half of the O-stand and the second portion 3" being formed by the lower half of the O-stand.

Disposed at the first portion 3' of the machine frame 3 is a working drive 5 comprising a hydraulic cylinder 7 in that a working piston 9 is guided along its longitudinal mid-axis. The working piston 9 delimits a working pressure space 11 which can be acted upon hydraulically for the purpose of moving the working piston 9. Furthermore, arrangements for moving the working piston 9, in particular a pressure medium supply and control valves, which are not illustrated in FIG. 1, are provided for the working drive 5. A working tool 10 for machining a workpiece W is disposed on the working piston 9.

The stamping machine 1 has, furthermore, a workpiece receptacle 14 which is designed as a stamping die 13 and which is disposed opposite the working drive 5 on the second portion 3" of the machine frame 3.

When the working pressure space 11 is acted upon hydraulically, the working piston 9 is moved along its longitudinal mid-axis in the direction of the workpiece W. This defines a working direction for the working drive 5. When the working piston 9 is moved in the working direction to an extent such that the working tool 10 lies on the workpiece W, a working force is exerted on the workpiece W by the action of pressure upon the working pressure space 11. The pressure in the working pressure space 11 in this case constitutes a control variable by means of which the working force can be determined.

The device 2 for cutting shock damping provides a supporting cylinder 16 which is disposed on the first portion 3' of the machine frame 3. In the device 2, a further supporting cylinder 16' is provided which is designed identically to the supporting cylinder 16 and which is disposed on the first portion 3' with the supporting cylinder 16 symmetrically with respect to the working drive 5. The supporting cylinder 16' is operated jointly with and in the same way as the supporting cylinder 16, and therefore only the supporting cylinder 16 is referred to in the following description for the sake of greater clarity.

A supporting piston 18 is guided movably along the working direction of the working drive 5 in the supporting cylinder 16. The supporting piston 18 delimits a supporting pressure space 20 which can be acted upon with a hydraulic pressure fluid for the purpose of moving the supporting piston in the working direction. Moreover, the supporting piston 18 delimits, by means of a portion facing away from the supporting pressure space 20, a release pressure space 26 which can be acted upon with pressure fluid for the purpose of moving the supporting piston 18 opposite to the working direction. The supporting piston 18 has a bearing plate 19 on its end portion facing the workpiece W.

Supporting bolts 22 with supporting plates 23 are provided on the second portion 3" and are disposed in the region of the stamping die 13 in such a way that a machine frame-side bearing portion 24 is provided for the workpiece W to be machined. The supporting bolts 22 are in this case disposed opposite the supporting cylinders 16, 16' in such a way that, when the supporting piston 18 is moved in the working direction, the bearing plate 19 can act via the workpiece W upon the assigned supporting plate 23.

The supporting pressure space 20 is connected to a regulating valve 30 via a pressure line 28. The regulating valve 30 is designed as a 3/3-way valve with three accesses, which has two further switching positions in addition to a neutral position, in the one switching position the pressure line 28 being connectable to a reservoir T for pressure fluid, and in the other switching position the pressure line 28 being connectable to a pressure fluid supply LP. The pressure fluid supply LP is in this case designed as a pressure accumulator for pressure fluid which can both provide and receive pressure fluid under corresponding pressure. The regulating valve may alternatively also be designed as a 3/2-way valve with three accesses, via which the supporting pressure space 20 can be connected selectively to the reservoir T or to the pressure fluid supply LP.

The pressure fluid supply LP is constantly connected, furthermore, to the release pressure space 26 via a compensating pressure line 27.

An actuating unit 32 designed as a hydraulic throttle valve 34 is disposed in the pressure line 28 between the supporting pressure space 20 and the regulating valve 30. The throttle valve 34 has two accesses and two switching positions, the one switching position corresponding to a passage position of the actuating unit 32 and the other switching position corresponding to a throttle position of the actuating unit 32. The throttle valve 34 is in this case designed in such a way that, in the throttle position, a flow cross section for pressure fluid which is reduced, as compared with the passage position, is provided.

As an alternative solution, not illustrated, for the throttle valve 34, it is conceivable that a flow diaphragm for throttling the throughflow of pressure fluid is disposed in the pressure line 28, said flow diaphragm being bypassed by a selectively closable bypass line. For closing the bypass line, the latter has disposed in it an actuating valve which is closed in the throttle position and open in the passage position.

The throttle valve 34 is designed in a way known per se as a hydraulically switchable directional valve. For this purpose, the throttle valve 34 has an actuating member, not illustrated, which is guided between the passage position and the throttle position. The actuating member provides a hydraulic active surface, not illustrated, which can be acted upon hydraulically via a first control access 36 of the throttle valve 34. When the first control access 36 is acted upon, the actuating member is forced into the throttle position. A second hydraulic active surface, not illustrated, which can be acted upon via a second control access 38 is provided correspondingly. In this case, when the second active surface is acted upon, the actuating member is moved into the passage position. The second control access 38 is connected permanently to the pressure fluid supply LP via a further pressure line 39. The throttle valve 34 or the actuating unit 32 is thereby prestressed into the passage position.

In the device 2 illustrated in FIG. 1, the first control access 36 is pressure-connected to the working pressure space 11 of the working drive 5 via a control pressure line 40. Thus, with a rising pressure in the working pressure space 11, the throttle valve 34 is changed over from the passage position, held as a result of the prestress described, into the throttle position. For this changeover, a switching threshold value is fixed in that the first hydraulic active surface has a specific fraction of the size of the second hydraulic active surface. Alternatively, it is conceivable to set the prestress via the pressure of the pressure fluid supply LP or by a mechanical spring means which acts upon the actuating member of the throttle valve 34 in the direction of the passage position.

Thus, in the device 2, the throttle valve 34 is in the passage position as long as the pressure in the working pressure space 11 lies below the limit fixed by the switching threshold value. If the pressure in the working pressure space 11 rises above this limit, the throttle valve 34 switches into the throttle position, with the result that the flow cross section for pressure fluid is restricted.

The further supporting cylinder 16' is influenced by the throttle valve 34 in the same way as the supporting cylinder 16.

The functioning of the device 2 for cutting shock damping during the operation of the stamping machine 1 is described below.

Initially, the working piston 9 is in a retracted state in which the working tool 10 is spaced apart from the workpiece receptacle 14. Due to the prestress, the actuating unit 32 is in the passage position. The regulating valve 30 is first switched in such a way that the supporting pressure space 20 is connected to the reservoir T. Since the release pressure space 26 is permanently connected to the pressure fluid supply LP via the compensating pressure line 27, the supporting piston 18 is moved opposite to the working direction, that is to say upward in FIG. 1. The region of the workpiece receptacle 14 consequently becomes freely accessible and a workpiece W can be delivered to the stamping machine 1, as illustrated in FIG. 1, the workpiece W lying on the supporting plates 23 and on the stamping receptacle 13.

The working piston 9 is thereupon moved in the working direction to the workpiece W. At the same time, the regulating valve 30 is switched in such a way that the supporting pressure space 20 is connected to the pressure fluid supply LP via the pressure line 28. In this case, pressure fluid is delivered to the supporting pressure space 20 until the bearing plate 19 lies on the workpiece W and presses the latter onto the supporting plates 23.

As soon as the working tool 10 lies on the workpiece W, stronger action upon the working pressure space 11 leads to the build-up of working force upon the workpiece W (pressure build-up phase). In this case, the workpiece W applies a corresponding counterforce to the working force of the working drive 5. During the pressure build-up phase, forces therefore act upon the machine frame 3, in particular between the first frame portion 3' and the second frame portion 3". This leads to elastic deformation of the machine frame 3, in particular the first frame portion 3' being pressed away from the second frame portion 3".

During the pressure build-up phase, the supporting pressure space 20 is connected to the pressure fluid supply LP via the regulating valve 30, so that the supporting piston 18 is moved so as to follow the deformation of the machine frame 3. In particular, bending of the first frame portion 3' away from the second frame portion 3" causes the supporting piston 18 to be extended and therefore pressure fluid to be delivered to the supporting pressure space 20.

A switching threshold value for the pressure in the working pressure space 11 is stipulated via the size ratio of the hydraulic active surfaces of the threshold value 34. This switching threshold value is selected according to a limit working force by which the machine frame 3 is not yet appreciably deformed elastically (for example, in the region of 30% of the maximum force of the working drive 5).

If the pressure in the working pressure space 11 rises above the switching threshold value during the pressure build-up phase, the throttle valve 34 is switched into the throttle position counter to the prestress described.

If the working force overshoots the maximum force which the workpiece W in the stamping die 13 can absorb, the workpiece W yields essentially abruptly (cutting breakthrough phase). Correspondingly, the force which is transmitted via the workpiece W to the machine frame 3 and leads to the elastic deformation of the machine frame 3 also diminishes abruptly. However, since the elastic deformation of the machine frame 3 is associated with a movement of the supporting piston 18 in the supporting cylinder 16, during the elastic reforming of the machine frame 3 after the cutting breakthrough of the workpiece W the supporting piston 18 is moved back correspondingly. As regards FIG. 1, during reforming, the supporting piston 18 is pressed into the supporting cylinder 16 again opposite to the working direction. This entails a corresponding change in volume of the supporting pressure space 20. Since the throttle valve 34 is in the throttle position, the pressure fluid can flow out only via a reduced flow cross section. The return movement of the supporting piston 16 is thus damped by the throttling. In this case, depending on the switching position of the regulating valve 30, the displaced pressure fluid is discharged into the pressure fluid supply LP or into the reservoir T.

The supporting piston 16 consequently exerts a supporting force counter to an abruptly elastic reforming of the machine frame 3, thus leading to a slow reforming movement which is less harmful or harmless to the machine frame 3.

However, the described cutting shock damping during the elastic reforming of the machine frame 3 takes place only when the force required for the cutting breakthrough of the workpiece W lies above the minimum force defined by the switching threshold value. A less stable or a thinner workpiece can consequently be stamped by means of the stamping machine 1, without throttling of the return movement of the supporting piston 16 taking place. Furthermore, by means of the regulating valve 30, cutting shock damping can be permanently deactivated. This may be advantageous, for example, for a tool change, a workpiece change, during the operation of setting up the work machine or for presettings.

The invention claimed is:

1. A working machine including a device for cutting shock damping of the working machine, the working machine comprising:
    a machine frame;
    a working tool;
    a working drive that moves the working tool along a working direction, wherein the machine frame is deformed elastically by a working force exerted by the working drive for machining a workpiece, the working drive providing a control variable for determining the working force,
    the device for cutting shock damping including
        a supporting cylinder with a supporting piston which is moveable along the working direction and which delimits a supporting pressure space which is acted upon with pressure fluid to move the supporting piston, wherein the supporting cylinder is disposed on the machine frame in such a way that elastic reforming of the machine frame is damped via a movement of the supporting piston in the supporting cylinder, and
        an actuating unit which is controllable by the control variable of the working drive and which is switched between a throttle position and a passage position, wherein in the throttle position, the actuating unit selectively throttles the outflow of pressure fluid from the supporting pressure space, and wherein in the passage position, the actuating unit releases the outflow of pressure fluid from the supporting pressure space, wherein the actuating unit is configured such that when the control variable lies below the switching threshold value, the actuating unit assumes the passage position and when the control variable lies above the switching threshold value, the actuating unit switches into the throttle position to damp the elastic reforming, wherein the machine frame has a first frame portion, on which the working drive is disposed, and the machine frame has a second frame portion, against which the workpiece is positioned for its machining, the supporting cylinder being disposed so as to act between the first frame portion and the second frame portion in such a way that elastic reforming of the machine frame is damped.

2. The working machine as claimed in claim 1, wherein the actuating unit is disposed in a pressure line, via which the supporting pressure space is connected to a reservoir for pressure fluid and/or to a pressure fluid supply.

3. The working machine as claimed in claim 2 further comprising a regulating valve disposed in the pressure line between the actuating member and the reservoir, the regulating valve fluidly connecting the actuating member to the pressure fluid supply or to the reservoir.

4. The working machine as claimed in claim 1, wherein the actuating unit is designed as a throttle valve which, in the throttle position, has a flow cross section for pressure fluid which is reduced, as compared with the passage position.

5. The working machine as claimed in claim 1, wherein the actuating unit has a flow diaphragm for throttling the outflow and a bypass line which is parallel to the flow diaphragm and in which is disposed an actuating valve which is closed in the throttle position and open in the passage position.

6. The working machine as claimed in claim 1, wherein the working drive is designed as a hydraulic cylinder with a working pressure space which is acted upon with pressure to move the working tool in the working direction.

7. The working machine as claimed in claim 6, wherein the actuating unit includes a hydraulic active surface configured to change from the passage position to the throttle position, the active surface being stressable in the passage position, the active surface being determinative of the switching threshold value, and the active surface being capable of being acted upon with the pressure prevailing in the working pressure space.

8. The working machine as claimed in claim 1, wherein the working drive is an electric drive, which is supplied electrically with driving current for moving the working tool.

9. The working machine as claimed in claim 8, wherein the actuating unit has an electrically controllable switching member for changing over from the passage position to the throttle position, the switching member being stressable in the passage position for stipulating the switching threshold value and being switchable to the throttle position as a function of the driving current.

10. The working machine as claimed in claim 1 further comprising a regulating valve via which the supporting pressure space is connected to a pressure fluid supply.

11. The working machine as claimed in claim 1, wherein the machine frame provides a bearing portion configured to position the workpiece for machining, and wherein the supporting piston acts on the workpiece when the supporting pressure space is acted upon.

12. The working machine as claimed in claim 1, wherein the supporting piston delimits a release pressure space configured to be acted upon with pressure fluid for moving the supporting piston opposite to the working direction.

13. The working machine as claimed in claim 1, wherein at least two jointly acting supporting cylinders are provided, which are disposed symmetrically with respect to the working drive.

14. A method for cutting shock damping of a work machine that has a machine frame and a working drive for moving a working tool along a working direction, and in which the machine frame is deformed elastically by a working force exerted by the working drive for machining a workpiece, the work machine also having a machine frame-side supporting cylinder which includes a supporting piston moveable by the action of a pressure fluid upon a supporting pressure space, the method comprising:

providing, via the working drive, a control variable for determining the working force, disposing the supporting cylinder on the machine frame in such a way that elastic reforming of the machine frame is damped via a movement of the supporting piston in the supporting cylinder, filling the supporting pressure space with pressure fluid during the elastic deformation of the machine frame, and determining a switching threshold value for the control variable, damping the elastic reforming of the machine frame based on the control variable, and throttling the outflow of pressure fluid from the supporting pressure space when the control variable overshoots the switching threshold value.

15. The method as claimed in claim 14, wherein the switching threshold value is determined in such a way that the outflow from the supporting pressure space is throttled before elastic reforming takes place.

16. The method as claimed in claim 14, wherein the supporting pressure space is acted upon to exert a supporting force during the elastic deformation of the machine frame.

* * * * *